UNITED STATES PATENT OFFICE.

DELIA McGREGORY, OF LOS ANGELES, CALIFORNIA.

PROCESS OF MAKING BUTTER.

SPECIFICATION forming part of Letters Patent No. 430,536, dated June 17, 1890.

Application filed February 12, 1890. Serial No. 340,184. (No specimens.)

*To all whom it may concern:*

Be it known that I, DELIA McGREGORY, a citizen of the United States, residing at Los Angeles, in the county of Los Angeles and State of California, have invented a new and useful Improvement in the Manufacture of Butter, of which the following is a specification.

My invention is an improvement upon an invention heretofore made by me, and for which Letters Patent of the United States, No. 68,639, were granted to me on the 10th day of September, 1867, and for which British Letters Patent of October 16, 1873, were obtained by John Squire Castle, of Sidcup, in the county of Kent, England, upon information furnished to said Castle by me personally.

The object of my invention is to produce a wholesome, palatable, inexpensive compound, superior to my former compound in quality, texture, and appearance.

My present invention consists of the following ingredients compounded in the manner and proportions herein set forth, to wit: I take in proportion one pound of good dairy butter, three-fourths of a pound of pure, rich, fresh milk, and the interior portion or pure yellow substance of the yelk of one egg—that is to say, I separate from the yelk all the white, all the thin filmy skin or inclosing membrane which surrounds the yelk, and all the tread, leaving only the pure yellow portion. I place this pure yellow portion of the yelk in a dish with a few table-spoonfuls of the milk and beat it until it is thoroughly mixed with the milk. I then stir it into the rest of the milk. I then place the dairy butter in an ordinary dasher-churn and pour the milk and egg upon it. I then thoroughly mix the milk and egg with the butter and churn it in the ordinary manner, seasoning with salt to taste. When it is sufficiently mixed, the milk, egg, and butter will be completely combined, producing a little more than one and three-quarters of a pound of good firm butter, more palatable and wholesome than butter made wholly from cream, for the reason that there is less grease in it than in ordinary butter, and it is lighter and smoother in texture. There will be no remnant of liquid unless the milk has been adulterated.

In order to secure the best results, care must be taken that the thin skin or filmy membrane inclosing the yelk be removed, otherwise the resultant butter will have a shiny appearance.

Now having described my invention, what I claim as new, and desire to secure by Letters Patent, is—

The herein-described process for preparing artificial butter, which consists in removing from yelk of egg the inclosing membrane and tread, agitating or heating the same with fresh milk, and incorporating the mixture with dairy butter until a homogeneous mass is obtained.

DELIA McGREGORY.

Witnesses:
JAMES R. TOWNSEND,
N. J. JUDAH.